(12) United States Patent
Venkatesan et al.

(10) Patent No.: US 12,517,116 B2
(45) Date of Patent: Jan. 6, 2026

(54) TEST STRIP ASSEMBLY FOR ANALYSING BODILY FLUIDS AND DEVICES THEREOF

(71) Applicant: Varun Akur Venkatesan, Bangalore (IN)

(72) Inventors: Varun Akur Venkatesan, Bangalore (IN); Siddharth Pattnaik, Bangalore (IN); Dipankar Das, Bangalore (IN)

(73) Assignee: Inito Health Inc., Houston, TX (US)

( * ) Notice: Subject to any disclaimer, the term of this patent is extended or adjusted under 35 U.S.C. 154(b) by 1052 days.

(21) Appl. No.: 17/620,761

(22) PCT Filed: Jun. 20, 2020

(86) PCT No.: PCT/IN2020/050543
§ 371 (c)(1),
(2) Date: Dec. 20, 2021

(87) PCT Pub. No.: WO2020/255172
PCT Pub. Date: Dec. 24, 2020

(65) Prior Publication Data
US 2022/0341919 A1 Oct. 27, 2022

(30) Foreign Application Priority Data
Jun. 20, 2019 (IN) .............................. 201911024493

(51) Int. Cl.
*G01N 33/52* (2006.01)
*G01N 33/543* (2006.01)

(52) U.S. Cl.
CPC ..... *G01N 33/523* (2013.01); *G01N 33/54387* (2021.08)

(58) Field of Classification Search
None
See application file for complete search history.

(56) References Cited

U.S. PATENT DOCUMENTS

| | | | | |
|---|---|---|---|---|
| 2004/0214347 A1* | 10/2004 | LaBorde | .......... | G01N 33/54326 435/287.2 |
| 2007/0278097 A1* | 12/2007 | Bhullar | .............. | G01N 27/3272 219/121.64 |
| 2015/0025347 A1* | 1/2015 | Song | ...................... | A61B 5/207 600/362 |
| 2019/0232287 A1* | 8/2019 | Depa | ................. | B01L 3/502761 |

* cited by examiner

*Primary Examiner* — Jennifer Wecker
(74) *Attorney, Agent, or Firm* — Jose Cherson Weissbrot

(57) ABSTRACT

A test strip assembly 101 for dipping in a bodily fluid sample to analyse a presence or absence of one or more analytes is provided. The test strip assembly 101 includes a basal layer (1), a first adhesive layer (2) that is entirely present over the basal layer (1) a porous membrane (3) that is present over the first adhesive layer (2) and the bodily fluid flows in a lateral direction in the porous membrane (3); a second adhesive layer (4); and a number of detection labels (5) placed on the porous membrane through the adhesive layer (4) and receives bodily fluids flowing in the lateral direction in the porous membrane such that the bodily fluids then flow in a vertical direction in the detection labels (5). A device including the test strip assembly (101) is provided.

10 Claims, 7 Drawing Sheets

TEST STRIP ASSEMBLY FOR ANALYSING BODILY FLUIDS AND DEVICES THEREOF

FIELD OF INVENTION

The present embodiment generally relates to quantitative analysis of bodily fluids for presence of various constituents, or ions, or physical and chemical parameters, and particularly to a device and a method for analysis of various metabolites, ions, or physical or chemical parameters in bodily fluids to determine or diagnose any disorder or disease.

BACKGROUND OF THE INVENTION

Dipsticks or strips have been in use for a very long time for detecting presence of metabolites such as leukocytes, nitrite, pH, urobilinogen, protein, creatinine and microalbumin in urine and metals such as copper, iron and lead in water, and for analysis of various other kinds of chemical and physical parameters in different kinds of bodily fluids. For the detection of each metabolite or metal, there are specific detection labels containing reagents that react with the metabolite of interest and change colour. Colour intensity of a detection label gives an indication of the concentration of the corresponding metabolite.

Currently available designs require the dipstick to be inserted such that all the detection labels encounter the liquid. For such a testing paradigm, there can be various reasons for variation in test results. The results may differ based on the time for which the dipstick is kept in the liquid, orientation of dipping and time required for a substrate to interact with the detection reagent in order to cause an effective change. In addition, the volume of liquid available for reaction on any one detection label is not controlled or stoichiometric which may lead to spurious and inconsistent results.

In view of the foregoing, there is a need to develop a device or strip that only enables controlled exposure or uniform exposure of the bodily fluid with the labels, and at the same time providing accurate and quick analyses of the various constituents present in bodily fluids.

SUMMARY OF THE INVENTION

In view of the foregoing, an embodiment herein provides a device for analysis of bodily fluids such that it requires a limited exposure of the device to the fluid.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

In an aspect, a test strip assembly for dipping in a bodily fluid sample to analyse a presence or absence of one or more analytes is provided. The test strip assembly includes a basal layer, a first adhesive layer that is entirely present over the basal layer, a porous membrane that is present over the first adhesive layer, a second adhesive layer and a number of detection labels. The number of detection labels are connected with the porous membrane through the second adhesive layer. The porous membrane is smaller or equal in dimension to the basal layer. The basal layer is made up of resins, metal foils, or glass, wherein the resins are selected from the group consisting of polyvinyl alcohol, polystyrene, polyvinyl chloride, polyester or a polyamide. The adhesive layers are made up of polyethylene or polyvinyl alcohol. The second adhesive layer covers a bottom surface of the detection labels entirely enough to firmly affix the detection labels to the porous membrane. The porous membrane is made up of woven polymers, cellulose polymers, glass fibre polymers or mixed polymers that are a mixture of natural and synthetic polymers. The woven polymers include cotton and nylon. The cellulose polymers include nitrocellulose membranes. The mixed polymers include membrane materials such as CytoSep and Vivid Plasma Membrane. The porous membrane has a thickness of 15-200 microns and the porous membrane is 40-80% porous. The detection labels are made up of an absorbent carrier impregnated with reagents that change colour upon a chemical reaction with a metabolite. The labels for bodily fluids is for detecting glucose, ketones, uric acid, bilirubin, urobilinogen, pH and specific gravity. The direction of flow of the liquid analyte or bodily fluid is lateral i.e. along the membrane, and the flow of the bodily fluid sample or analyte is vertical in the detection pads or labels. In another aspect, a device for analysis of bodily fluids having is provided. The device includes a housing, a test strip assembly that is placed inside the housing, a top cover having an opening that provides a visualization of detection labels, and a number of openings in the housing for controlling a flow of an analyte sample. The device further includes a test strip assembly having a basal layer, a first adhesive layer that is entirely present over the basal layer and a porous membrane, that is present over the first adhesive layer, a second adhesive layer, and a number of detection labels. The device is required to be dipped partially into bodily fluids sample meant for analysis. The device is required to be dipped such that only the tip of the test strip assembly is dipped into the bodily fluids sample. The opening is covered by a removable cap. The housing and the caps are made up of plastic material. The plastic material is selected from the group consisting of polycarbonate, acrylonitrile butadiene styrene, high density polyethylene polystyrene and polypropylene or a combination thereof. The device carrying the test strip in the housing is inserted into an optical device, such that the labels are read by a handheld device's camera and light source for detection of presence or absence of an analyte in a bodily fluid.

The device and/or the test strip assembly is required to be dipped partially into the bodily fluids sample meant for analysis such that only the tip of the device is required to be dipped. The bodily fluids sample include blood, spit, urine, blood serum or any such biological sample that has been liquified, in which presence or absence of a chemical or biological constituent is to be determined.

BRIEF DESCRIPTION OF THE DRAWINGS

Other objects, features, and advantages of the invention will be apparent from the following description when read with reference to the accompanying drawings. In the drawings, wherein like reference numerals denote corresponding parts throughout the several views.

DETAILED DESCRIPTION OF THE PREFERRED EMBODIMENTS

Figure 1:
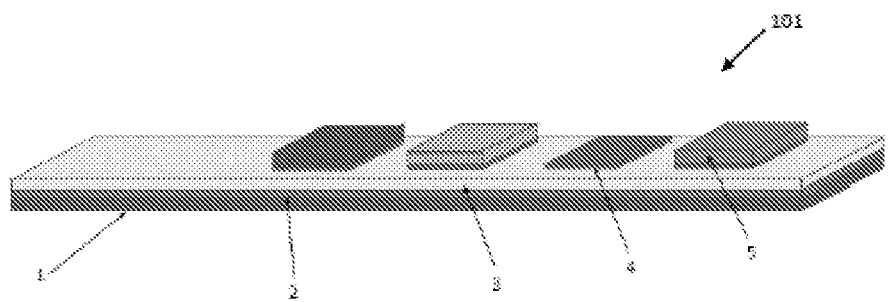
FIG. 1 is an isometric view of a test strip assembly 101 of the device for analysis of fluids, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a diagnostic strip and device for analysing bodily fluids that require only partial exposure of the strip and device into the bodily fluid sample. The embodiments herein achieve this by providing a strip and a device incorporating the strip is required to be dipped at the tip into the bodily fluid sample for detecting the presence or absence of one or more analytes in the bodily fluid sample Referring now to the drawings, and more particularly to FIGS. 1 through 7, where similar reference characters denote corresponding features consistently throughout the figures, there are shown preferred embodiments.

The term "bodily fluid" or "bodily fluid sample" refers to the fluids in or on a human or animal body. The examples include sweat, urine, blood, blood serum, semen, breast milk, saliva, blood plasma, tears, mucus, cerebrospinal fluids, saliva, amniotic fluid, vaginal lubrication fluids, pus, lymph, bile, synovial fluid, aqueous humour, phlegm, gastric acid, pre-ejaculate, colostrum and other such fluids related to animals or humans. The bodily fluid may also include the bodily matter that has been liquified by mixing in a solvent such as water. The two phrases "bodily fluid" and "bodily fluid sample" are used interchangeably across the present specification.

The term "analyte" refers to hormones, ions, proteins, lipids, sugar, oxygen, antibodies, enzymes, carbohydrates, virus, bacteria or any other foreign particles, metabolites that may be detected and analysed, qualitatively or quantitatively, to determine the state of health or general well-being of an animal or a human.

Figure 2:
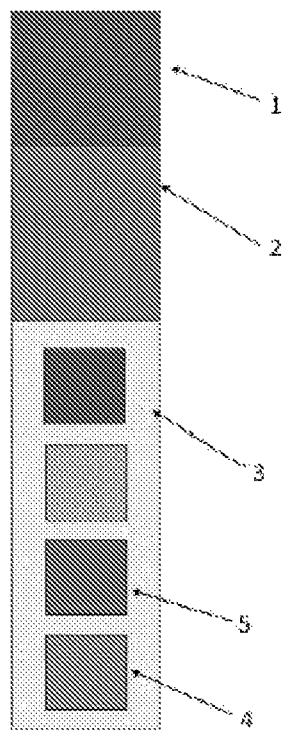
FIG. 2 is a top view of the test strip assembly 101, according to an embodiment herein.
Figure 3:
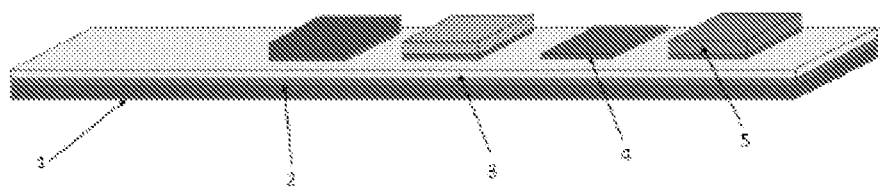
FIG. 3 is an isometric view of the test strip assembly 101 showing a minimum of three detection labels, according to an embodiment herein.
Figure 4:
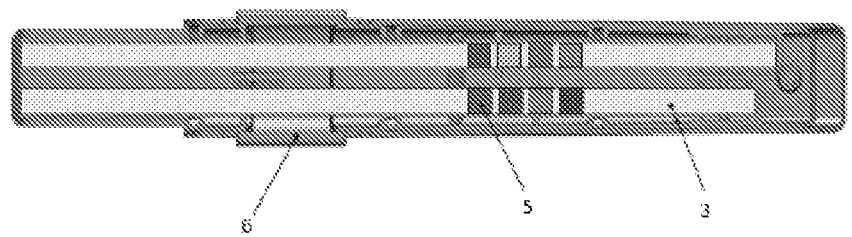
FIG. 4 is a top view of the device for the analysis of fluids showing two test strips assemblies of FIG. 1-3, placed parallel to each other, according to an embodiment herein.
Figure 5:
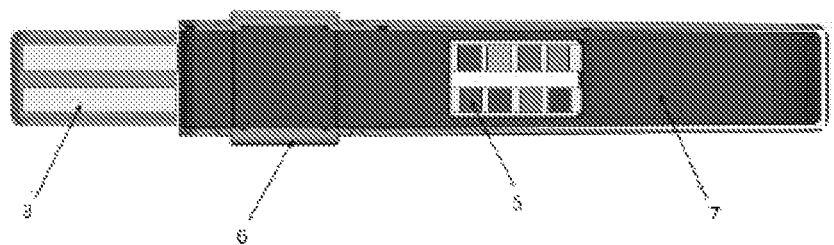
FIG. 5 is a top view of the device of FIG. 4 inserted into a housing, according to an embodiment herein.
Figure 6:
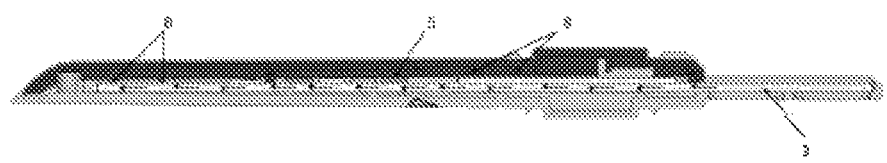
FIG. 6 is a side view of the device of FIG. 4, according to an embodiment herein.

FIG. 1-3 illustrate different views of a test strip assembly 101 of the device for analysis of fluids, according to an embodiment herein. The test strip assembly 101 includes a basal layer 1, a first adhesive layer 2, a porous membrane 3, a second adhesive layer 4, and a plurality of detection labels 5. In an embodiment, the first adhesive layer 2 is entirely present over the basal layer 1. In an embodiment, the porous membrane 3 is present over the first adhesive layer 2. The number of detection labels 5 are connected with the porous membrane 3 through the second adhesive layer 4. In a preferred embodiment, the porous membrane 3 is smaller or equal in dimension to the basal layer 1. In an embodiment, the detection labels 5 are smaller in dimension compared to the porous membrane 3 and vary in number on one test strip 101. The entire test strip assembly 101 is placed into a customized cassette/housing 6, as shown in FIG. 4-6, which is greater than or equal in length to the test strips assembly 101. The cassette/housing 6 has an opening. The opening is covered by a removable cap. The opening is designed to expose the zone containing the detection labels 5 on the test strip assembly 101 in order to be read by naked eyes or by a reader. In an embodiment, the housing 6 can house a number of test strips 101 to run several kind of tests parallelly and/or simultaneously using different bodily fluids at the same time. In an embodiment, the housing 6 houses the number of test strip assemblies 101 such that each of the test strip assembly is parallel to each other. FIG. 4 and FIG. 5 illustrates a housing 6 having two test strip assemblies 101 lying parallel to each other, within the housing. The housing, thus, can be adapted to include as many test strip assemblies 101 as possible to have multiple detection and/or diagnosis using different bodily fluids simultaneously at the same time.

According to an embodiment of the present invention, the basal layer 1 of the test strip assembly 101 is made up of resins, metal foils, or glass. The resins are selected from the group consisting of polyvinyl alcohol, polystyrene, polyvinyl chloride, polyester or a polyamide. The adhesive layers between the basal layer/sheet 1 and porous membrane 3, and between the porous membrane 3 and detection labels 5 is made up of fusion of adhesives like polyethylene or polyvinyl alcohol. The first adhesive layer 2 covers the entire top surface of the basal layer 1. The adhesive layer 2 needs to be hardened so that the abutting of basal sheet 1 and porous membrane 3 is firm. The second adhesive layer 4 covers the bottom surface of the detection label 5 entirely or enough firmly affix the detection label to the porous membrane 3. The material used as adhesive can be the same for both the adhesive layers.

The porous membrane 3 is made up of cellulose based polymers such as nitrocellulose membrane and non-woven cellulose fibre membranes. Alternatively, blends of natural and synthetic polymers such as CytoSep is also used depending on the application. Glass fibres are also used as a material for the porous membrane layer. Typically, the thickness of the porous membrane should be between 15-200 microns and 40-80% of the surface should be porous. The membrane can be varied according to the type of metabolite to be analysed, within the given limits.

In a preferred embodiment, the porous membrane in the strip 101 is made up of several material. In a preferred embodiment, the porous membrane is made up of are either woven polymers, cellulose polymers, glass fibre polymers or mixed polymers that are a mixture of natural and synthetic polymers. The examples of woven polymers include cotton and nylon. The examples of cellulose polymer membranes include nitrocellulose membranes. The examples of mixed polymers include membrane materials such as CytoSep and Vivid Plasma Membrane. The pore sizes for the membranes typically range from 8-15 microns for all samples with very low viscosity such as urine or water. In an embodiment, the low viscosity fluids have viscosity less than 0.002 Pa-s. However, while working with highly viscous fluids such as whole blood, membranes with low pore size ranging from 0.1-5 microns are generally used. In an embodiment, the high viscosity fluids have viscosity higher than 0.002 Pa-s.

The detection labels 5 preferably includes an absorbent carrier such as filter paper impregnated with reagents that change colour upon chemical reaction with the metabolite. In an embodiment, a mix of detection reagents with neutral solid materials can also be used as detection labels. The reagents are immobilised on detection pads or labels 5 in a manner that avoids cross-contamination of reagents i.e. immobilized reagent doesn't flow along with the analyte in a bodily fluid. In a preferred embodiment, the absorption properties of all the detection pads or labels in the assay must be the same in order to maintain a uniform flow rate from start to end of the assay. In a preferred embodiment, the thickness of all detection pads or labels 5 is kept same and the distance between them is maintained in order to enable uniform availability of the analyte, in a bodily fluid, at different detection pads or labels 5.

The device and the test strip 101 assembly is required to be dipped partially into the bodily fluids sample meant for analysis such that only the tip of the device is required to be dipped.

In a preferred embodiment, the direction of flow of the liquid analyte or bodily fluid is lateral i.e. along the membrane 3, and the flow of the same analyte, after contacting with detection pads/labels 5, is vertical in the detection pads or labels 5.

The labels for bodily fluids may be for detecting glucose, ketones, uric acid, bilirubin, urobilinogen, pH and specific gravity. In an embodiment, a plurality of detection labels 5 may be arranged on the test strip 101. In an embodiment, the test strip 101 includes label for testing pH, which includes reagents such as methyl red, bromothymol blue and methanol or a mix of them. In another embodiment, the test strip 101 includes label for testing presence or absence of protein, which includes reagents such as sodium Sodium citrate, Citric acid, lauroylsarcosine, water, Magnesium sulfate, Tetrabromophenolphthalein ethyl ester and methanol or a mix of them. In yet another embodiment, the test strip 101 includes a label 105 for detection of urobilinogen in urine and the label includes reagents such as 4-cyclohexylaminobenzaldehyde, Oxalic acid, Methanol or a mix of them. Similarly, the label 105 for detecting glucose includes O-tolidine, Peroxidase, Glucose oxidase, Tartrazine, Ethanol (44%) or a mix of them. In still another embodiment, the test strip 101 includes a label 5 for detection of hydrogen peroxide via reagents that include Polyvinyl propionate dispersion, Phosphate buffer, Sodium alginate, Sodium lauryl sulfate, O-tolidine, Peroxidase and Methanol or a mix of them. Similarly, the presence of nitrates may be determined by the test strip 101 through the label 5 incorporating reagents that include sulphanilamide, a-naphthylamine, tartaric acid and methanol or a mix thereof.

The layer of porous cellulose polymer membrane in between the backing sheet and the detection labels allow the liquid analyte to travel from the point of contact with strip to the detection labels by capillary action. This ensures a controlled flow of the analyte to the detection labels which makes the analysis easier and more accurate. Furthermore, due to this porous membrane enabled capillary action, only the tip of the strip is required to be dipped in an analyte solution.

The plastic cassette/housing 6 and top cover 7 are made up of plastic materials such as polycarbonate plastics, acrylonitrile butadiene styrene, high density polyethylene, polystyrene and polypropylene. A combination of two or more plastics can also be used. Preferably, the same material is used for the plastic cassette and the cap.

Figure 7:
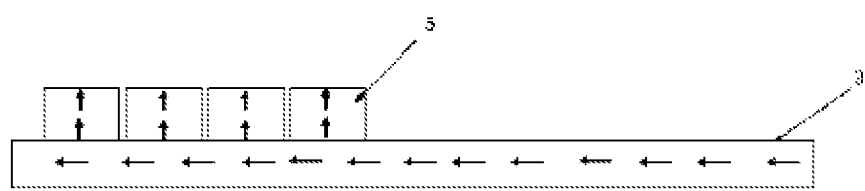
FIG. 7 shows the flow of the analyte sample fluid through capillary action in the test strop of FIG. 1, according to an embodiment herein.

The assembly of the test strip 101 circumvents the need for dipping the entire strip into the liquid analyte. In addition, placing the test strip in a cassette aids easy handling. The user may hold the housing from one end and the open end of the test strip can be dipped into the analyte solution. Once the analyte reaches the detection layer by capillary action, it can access the detection layer preponderantly from beneath, wetting the detection label which gives a quick and readable colour reaction. FIG. 7 shows the flow of the analyte sample fluid through capillary action, according to an embodiment of the present invention. The plurality of openings 8 act as pinch points in the cassette for flow control of analyte sample. Thus, the test strip provides an easy and a more controlled way of detecting metabolites and metals in liquid analytes, which signifies greater consistency in the test results from one test to another.

In an embodiment, the device is adapted to be read by an optical device such that the labels 5 can be read using smartphone's or any handheld device's camera and light source to detect presence or absence as well as quantity of any constituent of any bodily fluid. In an embodiment, device is inserted into an optical device having a transparent optic defining an optical volume, a transparent optic having a first main face adapted for positioning the test strip assemble 101 for labels 5 to be imaged. The transparent optic is adapted to admit into the optical volume a light emitted by the light source for illuminating the labels 5 and wherein the transparent optic is adapted to admit the light having interacted with the labels 5, into the optical volume and turn the light inside the optical volume such that the light is internally reflected within the optical volume and exit the optical volume to be incident onto the camera. Alternatively, the device of the present embodiment can be inserted into a stand-alone or specialised optical readers or devices meant to detect presence or absence of an analyte in a bodily fluid.

In an embodiment, a method for detection of an analyte in the bodily fluid sample using a strip that is only required to be dipped partially into the bodily fluid sample is provided. The method includes dipping the device of FIG. 4, having the housing that carries or encloses the test strip assembly of FIG. 1 into the bodily fluid sample such that bodily fluid sample travels in a lateral direction in the porous membrane of the test strip assembly and the detection label, placed on the porous membrane, receives the bodily fluid such that in the detection label flow of the bodily fluid sample is in vertical direction. This is followed by subjecting the device into an adapter that can be adapted to or attached to a handheld camera device such as a smartphone, such that the detection labels are read by the camera, to detect the presence or absence of any analyte in the bodily fluid sample and convey the results of the test to a cloud server or locally.

As will be readily apparent to those skilled in the art, the present invention may easily be produced in other specific forms without departing from its essential characteristics. The present embodiment are, therefore, to be considered as merely illustrative and not restrictive, the scope of the invention being indicated by the claims rather than the foregoing description, and all changes which come within therefore intended to be embraced therein.

What is claimed is:

1. A test strip assembly (101) for dipping in a bodily fluid sample to analyse a presence or absence of one or more analytes comprising: a basal layer (1), a first adhesive layer (2), wherein the first adhesive layer (2) is entirely present over the basal layer (1); a porous membrane (3), wherein the porous membrane (3) is present over the first adhesive layer (2) and the bodily fluid flows in a first direction in the porous membrane (3); a second adhesive layer (4); and a plurality of detection labels (5) placed on the porous membrane through the adhesive layer (4) and configured to receive bodily fluids flowing in the first direction in the porous membrane such that the bodily fluids then are configured to flow in a second direction in the detection labels (5), wherein the second direction is perpendicular to the first direction.

2. The test strip assembly (101) as claimed in claim 1, wherein the porous membrane (3) is smaller or equal in dimension to the basal layer (1).

3. The test strip assembly (101) as claimed in claim 1, wherein the basal layer (1) is made up of resins, metal foils, or glass, wherein the resins are selected from the group consisting of polyvinyl alcohol, polystyrene, polyvinyl chloride, polyester or a polyamide.

4. The test strip assembly (101) as claimed in claim 1, wherein the adhesive layers are made up of polyethylene or polyvinyl alcohol.

5. The test strip assembly (101) as claimed in claim 1, wherein the second adhesive layer 4 covers a bottom surface of the detection labels (5) entirely or enough firmly affix the detection labels (5) to the porous membrane.

6. The test strip assembly (101) as claimed in claim 1, wherein the porous membrane (3) has a thickness of 15-200 microns and wherein the porous membrane (3) is 40-80% porous.

7. The test strip assembly (101) as claimed in claim 1, wherein the porous membrane has a pore size ranging between 8-15 microns for fluids with viscosity less than 0.002 Pa-s.

8. The test strip assembly (101) as claimed in claim 1, wherein the porous membrane has a pore size ranging between 0.1-5 microns for fluids having viscosity higher than 0.002 Pa-s.

9. The test strip assembly (101) as claimed in claim 1, wherein the detection labels (5) are made up of an absorbent carrier impregnated with reagents, wherein the reagents change colour upon a chemical reaction with a metabolite.

10. The test strip assembly (101) as claimed in claim 1, wherein the labels for bodily fluids is for detecting glucose, ketones, uric acid, bilirubin, urobilinogen, pH and specific gravity.

* * * * *